March 15, 1966  E. W. MERTENS  3,240,716
ASPHALT EMULSIONS
Filed Oct. 13, 1961
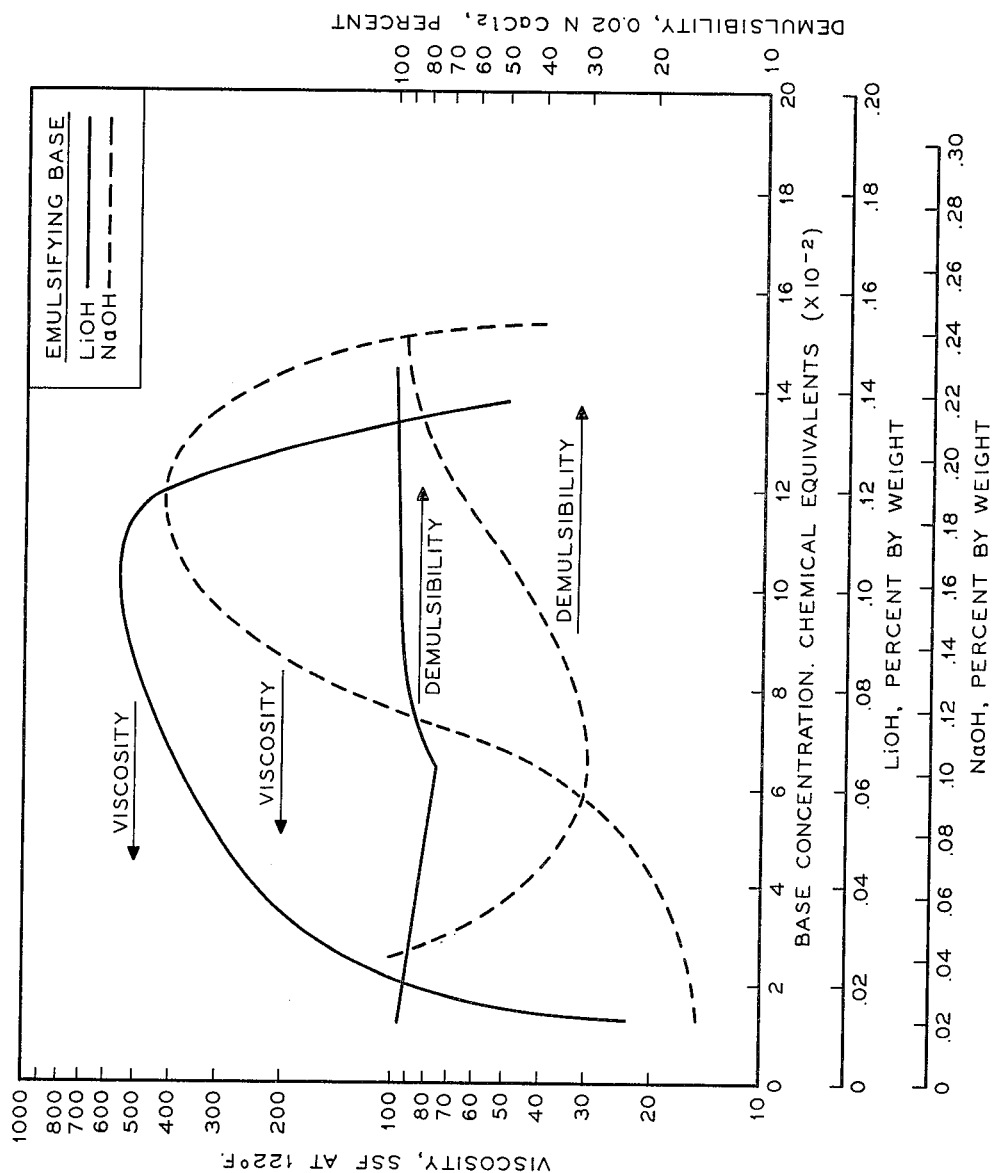
INVENTOR
EDWARD W. MERTENS
BY
ATTORNEYS

United States Patent Office 3,240,716
Patented Mar. 15, 1966

3,240,716
ASPHALT EMULSIONS
Edward W. Mertens, El Cerrito, Calif., assignor to Chevron Research Company, a corporation of Delaware
Filed Oct. 13, 1961, Ser. No. 159,808
6 Claims. (Cl. 252—311.5)

The present application is a continuation-in-part of application Serial No. 806,731 filed by the same applicant in the United States Patent Office on April 15, 1959, and now abandoned, which in turn is a continuation-in-part of application Serial No. 666,092, by the same applicant, filed June 17, 1957, and expressly abandoned on April 15, 1959, by a declaration of abandonment, filed June 1, 1959.

This invention relates to bituminous emulsions of the oil-in-water type, and, more particularly, it relates to quick-breaking (quick-setting) emulsions wherein the bituminous material is emulsified by an aqueous solution containing lithium hydroxide.

In the production of bituminous emulsions of the quick-breaking type, it has been common practice to employ certain asphalts which contain a sufficient amount of saponifiable constituents so that asphaltic emulsions of the desired type can be made by simply treating the bituminous material with an aqueous solution of sodium or potassium hydroxide. The preparation of these emulsions are described, for example, in Montgomerie U.S. Patent 1,643,675 and Braun U.S. Patent 1,737,491. In these particular quick-breaking type emulsions, the emulsion should separate rapidly on contact with aggregate, such as broken stone, sand or cement (due to their surface electrostatic charge), and the emulsion should likewise quickly demulsify in the presence of electrolytes such as calcium chloride. However, it has been found in many cases that, due to the presence of too many natural acids in the asphalt, in other words, when the asphalt is a high-acidity asphalt, the emulsions formed by either sodium or potassium hydroxide are too stable, i.e., too resistant to break down in the presence of an electrolyte. These emulsions cannot meet the demulsibility specifications set forth for quick-setting emulsions in the ASTM "Standard Specifications for Emulsifying Asphalt" (ASTM designation D-977-53), or yet, if a quick-breaking type emulsion is at all produced, this can be done only within extremely narrow concentration ranges of these conventional emulsifying bases (NaOH and KOH); outside these ranges, it is impossible to form emulsion that will meet the specification. Although this result is particularly true in the case of KOH, which, as is well known in the art, forms more stable emulsions than NaOH, the problem is also found to occur quite frequently in the case where emulsification is accomplished with NaOH. It has also been found that, in addition to the increase in stability upon storage of the emulsions prepared with sodium and potassium hydroxide, the viscosity of the emulsion prepared from a high-acidity asphalt often increases to such a degree that the emulsion cannot pass the viscosity test of the above-noted ASTM specification or, more practically, cannot be effectively used in field operations.

It has now been discovered that quick-breaking bituminous emulsions having extremely satisfactory stability and viscosity characteristics can be produced from bituminous materials, the natural acidity of which is at least about 2.0, generally from about 3.0 upwards, particularly in the range from about 3.0 to about 4.0 and even higher (in mgs. KOH per 1 g. of bitumen), by emulsifying said high-acidity material with an aqueous solution of lithium hydroxide having a concentration varying over a comparatively wide range of from about 0.015 to about 0.125 weight percent LiOH, based on the finished emulsion. It has been found that emulsions produced from these asphalts characterized by high acidity which is due to the inherent content of the so-called natural asphaltic or asphaltogenic acids, have viscosities that remain relatively constant over long periods of storage and that their stability is considerably less than the stability of those emulsions made with the conventional sodium and potassium hydroxides.

The emulsions of the present invention can be prepared by thoroughly admixing the hot, molten bituminous material characterized by a high acid content (that is acid value of at least 2.0 and, preferably, from about 3.0 to about 4.0) such as asphalt, coal tar, coal tar pitch, and the like, with a hot, aqueous solution of LiOH having a concentration within the range of from about 0.015 to about 0.125 weight percent LiOH. The emulsion should preferably contain about 55 to 65 percent by weight of bituminous material, based on the total weight of the emulsion. However, the quantity of dispersed material may be either higher (up to 80 percent or more) or lower (as low as 40 percent), as circumstances may require. In general, the emulsifying base is mixed with the bitumen at a temperature in the range of from about 120° F. to 180° F. in a mix pot. If a colloid mill is employed, the base temperature can be raised to 300° F. or more. The bitumen must be in a molten state, the temperature of which will depend upon the particular bitumen employed.

For the two grades of quick-setting (quick-breaking) asphalt emulsions (RS-1 and RS-2), ASTM designation D-977-53 specifies, among others, the following characteristics. Types RS-1 specifies a viscosity (Saybolt Furol at 77° F.) of not less than 20 nor more than 100 seconds, a residue of not less than 55 nor more than 60 percent, and a demulsibility (35 mls. of 0.02 N CaCl$_2$) of not less than 60 percent. Type RS-2 specifies the viscosity (Saybolt Furol at 122° F.) of not less than 75 nor more than 400 seconds, a residue of not less than 63 nor more than 68 percent, and a demulsibility (35 mls. of 0.02 N CaCl$_2$) of not less than 60 percent. Ordinarily, emulsions meeting these specifications will be used. However, since specifications are subject to change from time to time, and since requirements may vary from place to place, the specifications of the quick-breaking emulsion may vary in one or more respects from those of the above-preferred set of specifications.

The following specific examples will serve to illustrate the practice, utility and advantages of the subject invention.

*Example 1*

A series of 2500 g. batches of quick-breaking emulsions was prepared in a mix pot by emulsifying 61 parts by weight of hot, molten (250° F. to 275° F.) 200–300 penetration refined central California asphalt, characterized by acidities ranging from about 3.0 to about 3.2 (average acid value of about 3.05–3.10) as determined by the ASTM test method D-644-54, with 39 parts by weight of hot (160° F.), aqueous LiOH solution. The temperatures of the components here were representative of those normally employed.

The concentration and amounts of LiOH solution were so chosen as to provide a concentration varying from 0.013 to 0.144 percent LiOH, based on the final emulsion product. Distilled water was employed in making the basic solution. The resulting asphaltic emulsion possessed the characteristics shown in Table I. The viscosity (seconds Saybolt Furol, 60 mls. at 122° F.), and demulsibility characteristics were determined according to the "Standard Methods of Testing Emulsified Asphalts,"

ASTM Designation D-244-55. Briefly, the demulsibility test involves thoroughly mixing one 100 gram sample of emulsion with 35 mls. of 0.02 N CaCl$_2$ solution. The demulsibility of the particular emulsion is that percentage by weight of the asphalt present that fails to pass a No. 14 (1410-micron) wire cloth. The residue test determines the percentage by weight of residue obtained by heating a 25 gram sample of the emulsion until all of the water is evaporated. The heating is conducted on a hot plate at a temperature sufficient to evaporate the water without splattering. The sample is then cooled, weighed, and the percentage residue determined. This test affords a rapid means of determining the percentage residue of an emulsion and has been found to be accurate within about 0.2 to 0.4 percent of conventional residue determination tests. The determinations of viscosity, demulsibility, etc., were carried out within 24 hours after the preparation of emulsions.

TABLE I

| Reference No. | LiOH Percent | Properties | | | | |
|---|---|---|---|---|---|---|
| | | Viscosity, SSF at 122° F. | Demulsibility (0.02 N CaCl$_2$) | Residue, Percent | Particle range | Size ($\mu$) Predominant |
| 3318-40-A | 0.013 | 23 | 96 | 61.2 | 1-50 | Varied |
| 3318-40-B | 0.026 | 132 | 92 | 62.0 | 1-50 | 8-10 |
| 3318-40-C | 0.038 | 243 | 81 | 62.0 | 1-50 | 8-10 |
| 3318-40-D | 0.051 | 335 | 79 | 62.0 | 1-20 | 3-4 |
| 3318-40-E | 0.064 | 347 | 76 | 62.4 | 1-20 | 3-4 |
| 3318-40-F | 0.072 | 441 | 94 | 62.4 | 1-20 | 3-4 |
| 3318-40-G | 0.084 | 410 | 93 | 62.4 | 1-20 | 3-4 |
| 3318-40-H | 0.096 | 467 | 92 | 63.2 | 1-20 | 3-4 |
| 3318-40-I | 0.108 | 550 | 89 | 61.6 | 1-20 | 3-4 |
| 3318-40-J | 0.120 | 522 | 93 | 61.2 | 1-50 | 8-10 |
| 3318-42-E | 0.138 | [1] 50 | 100 | 62.0 | | |
| 3318-40-K | 0.144 | [2] | [2] | | | |

[1] Emulsion was thin and very grainy; viscosity value is not reliable.
[2] Emulsion broke in mix pot.

From the data shown in Table I, it can be seen that quick-breaking asphalt-in-water emulsions possessing excellent demulsibilities and viscosities are produced over a wide range of LiOH concentrations, and, particularly, in the range of from about 0.02 to about 0.125 weight percent LiOH. It was also observed that, even under lengthy storage conditions, after being stored for one week, and, in many instances, for as long as three weeks, at storage temperatures considerably higher (160° F.) than those normally used in practice, a great majority of the emulsions still maintained their high demulsibilities and at the same time most of the emulsions displayed relatively constant viscosities.

*Example 2*

For comparative purposes, a series of 2500 g. batches of quick-breaking emulsions were prepared by emulsifying 62 parts by weight of the identical hot, molten asphalt described in Example 1 hereinabove with 38 parts by weight of a hot, aqueous NaOH solution. The latter had a concentration varying from 0.02 to 0.24 weight percent NaOH. Again, distilled water was used to form the aqueous basic solution. In order to show best the superiority of LiOH over NaOH as an emulsifier, the viscosities and demulsibilities of both the LiOH formed emulsions of Example 1, and the NaOH formed emulsions of the present examples are plotted in the accompanying drawing. The latter is a semi-log plot, with the left ordinate scale representing the viscosity (SSF at 122° F.) and the right ordinate scale representing the demulsibility (percent). Three abscissa scales are shown; the upper scale being the base concentration in chemical equivalents, the middle scale being the LiOH concentration in weight percent, and the bottom scale representing the NaOH concentration, also in weight percent of the finished emulsion.

As noted hereinbefore, the ASTM "Standard Specifications for Emulsified Asphalts," Designation D-977-53, require that Type RS-2 quick-setting asphalt emulsions have demulsibilities above 60 percent and viscosities (SSF at 122° F.) between 75 and 400. Although the advantages of the present invention are not limited to meeting such specifications, they do offer a basis for comparing the demulsibilities and viscosities of the emulsions prepared by the LiOH and NaOH basic solutions. From the drawing, it can be seen that among the emulsions of asphalt characterized by an inherent acidity which is higher than about 2.0, prepared with the aid of a wide range of varying concentration of NaOH solutions, only those emulsions prepared with the aid of aqueous solutions of NaOH containing from about 0.20 to about 0.243 weight percent NaOH, based on the final emulsion ($12.5 \times 10^{-2}$ to $15.2 \times 10^{-2}$ chemical equivalents), will pass both the ASTM demulsibility and viscosity requirement. However, in the case of the LiOH formed emulsions of the same high-acidity asphalts, it can be seen that the ASTM demulsibility and viscosity specifications can be met over a much wider range of LiOH concentration, namely, from about 0.018 to 0.068 weight percent LiOH ($1.9 \times 10^{-2}$ to $7.1 \times 10^{-2}$ chemical equivalents), and also over another range of concentrations, from about 0.122 to about 0.136 weight percent LiOH ($12.7 \times 10^{-2}$ to $14.2 \times 10^{-2}$ chemical equivalents). Thus, a great deal more flexibility in obtaining an emulsion of a particular viscosity and demulsibility can be attained by using LiOH as the emulsifying base for asphalts characterized by acidities from at least about 2.0 and higher, while at the same time, better emulsions can be prepared using much lower concentration of the emulsifying base, on a weight percent basis, than in the case of NaOH formed emulsions. Furthermore, the data show that over the entire range of LiOH formed emulsions, every single emulsion of high-acidity asphalt has a demulsibility well over the 60 percent ASTM minimum, with the lowest demulsibility value over this entire range still being 76 percent. This must be contrasted with the NaOH-asphalt emulsions wherein only a small number, as shown by the drawing, display demulsibilities in excess of 60 percent. Thus, it is apparent that emulsions prepared with LiOH as the emulsifying base are much more readily demulsifiable than those prepared using the conventional NaOH.

In addition to the basic essential ingredients of the emulsions of the present invention, namely, the bituminous material characterized by an acidity of at least about 2.0, and the aqueous LiOH solution, the emulsion of the present invention may contain small effective proportions of conventional additives that have been found in the past to enhance particularly desired qualities of quick-breaking emulsions, provided their inclusion does not impair the beneficial effect of the employment of LiOH emulsifying base on the demulsibility and viscosity of these emulsions. Thus, anti-stripping agents, thickeners, dispersing agents, clay and the like, may be incorporated in the emulsions.

Where climatic extremes are encountered in the field, small amounts of conventional stabilizers may be added to assist in controlling to a fine degree the tendency of the emulsions to demulsify on prolonged storage. Here again, one would exclude those stabilizers, whether organic or inorganic, which may affect adversely the benefits due to the employment of LiOH base and would cause the lowering of demulsibility to less than the specified ASTM minimum of 60%.

*Example 3*

This example is given to show the need of excluding from the emulsions formed with LiOH such stabilizers as would be apt to affect adversely the demulsibility improvement occasioned by the application of LiOH base for the preparation of the emulsion. There are many such stabilizers, and they are particularly detrimental and therefore unsuitable, if the emulsion is stored, even though but for as short a period as overnight. A typical example of such unsuitable stabilizers is the lignin product available in the form of lignin sulfonic acid derived from black liquor of the soda pulp process, obtained according to the description given in the U.S. Patent 2,228,976 to Reboulet, and known in the trade under the names of "Lignin M" and "Meadol."

Two parallel series of test runs have been carried out, in each of them 3000 g. batch of emulsion having been prepared by emulsifying the 200–300 penetration central California asphalt with acid values of about 3.2 to about 3.3, otherwise identical to the asphalt of Examples 1 and 2. The same emulsifying technique of emulsifying 62 parts by weight of hot, melted asphalt with 38 parts by weight of a hot aqueous LiOH solution was employed. In Series (a) emulsions were prepared and tested without including the lignin product stabilizer in their composition. In Series (b) all emulsions included in their composition a small amount equal to 0.25% by weight of the aforementioned lignin product.

After emulsification, the emulsions of both series were left to stand for about 16 hours at a temperature of 160° F., and then their demulsibilities were determined, in accordance with the ASTM Test Method D–244–55, and compared. The results of these determinations are offered in the following Table II.

TABLE II

| | Reference symbol of run | LiOH, percent by weight of final emulsion | Residue in percent | Demulsibility (0.02 N CaCl₂) in percent |
|---|---|---|---|---|
| Series (a) | B₁ | 0.026 | 62.0 | 90 |
| | D₁ | 0.051 | 61.6 | 69 |
| | F₁ | 0.072 | 62.7 | 62 |
| | H₁ | 0.096 | 58.7 | 94 |
| | J₁ | 0.120 | 56.3 | 100 |

WITH INCORPORATION OF 0.25% BY WEIGHT OF THE LIGNIN PRODUCT

| | Reference symbol of run | LiOH, percent by weight of final emulsion | Residue in percent | Demulsibility (0.02 N CaCl₂) in percent |
|---|---|---|---|---|
| Series (b) | B₂ | 0.026 | 59.2 | 26 |
| | D₂ | 0.051 | 60.6 | 16.5 |
| | F₂ | 0.072 | 58.7 | 15.3 |
| | H₂ | 0.096 | 57.3 | 12.2 |
| | J₂ | 0.120 | 59.2 | 3.4 |

The results of Table II clearly indicate that all emulsions which included in their formulation 0.25% by weight of the lignin product stabilizer, on being tested after the storage of 16 hours, failed to come up to the minimum of demulsibility of 60% by weight, specified for quick-setting emulsions in the ASTM Standard D–977–53.

*Example 4*

A further aspect of the present invention, namely, the fact that under certain conditions excellent quick-breaking emulsions can be made by emulsifying the bituminous material with an acidity of 2.0 and higher with the aid of an aqueous solution comprising a mixture of LiOH and conventional alkali metal hydroxides (such as NaOH and KOH, and the like), is demonstrated in this example. It has been found that by varying the proportionate concentrations of both the LiOH and alkali metal hydroxide or hydroxides, excellent control of the demulsibility and viscosity of emulsions can be attained. This feature of the invention is particularly useful in controlling the stability and viscosity of those asphalts which, when emulsified with conventional NaOH or KOH, have borderline demulsibilities and/or viscosities insofar as utility in the field or in meeting specifications is concerned. The advantages of such mixtures in effecting demulsibility and viscosity control is shown in the following Table III, which presents these properties as determined for a series of emulsions prepared by using various mixtures of LiOH and NaOH for emulsifying high-acidity asphalts. All of the emulsions were prepared in 3000 g. batches by emulsifying 57 parts by weight of a similar hot, molten 200–300 penetration central California asphalt (acid value of about 3.1) with 43 parts by weight of hot, aqueous mixtures of LiOH and NaOH. All of the emulsions shown in Table III contain the same number of chemical equivalents of total caustic (base concentration in chemical equivalents was $6.9 \times 10^{-2}$).

TABLE III

| Base, wt. percent of final emulsion | | Demulsibility (0.02 N CaCl₂) |
|---|---|---|
| NaOH | LiOH | |
| 0.093 | 0 | 48 |
| 0.07 | 0.014 | 89 |
| 0.056 | 0.022 | 92 |
| 0.037 | 0.033 | 96 |
| 0.023 | 0.042 | 100 |
| 0 | 0.055 | 100 |

Additionally, small quantities of different alkali salts, preferably lithium, may be included in the emulsion product. Among them, there may be mentioned chlorides, phosphates, chromates, sulfates, nitrates, and the like. These salts, in particular, lithium and sodium chromates, serve to enhance adhesion property. They should be essentially neutral. However, if they are acidic, additional basic emulsifier can be supplied to account for the base neutralized by the salt. Likewise, if the salts are basic, less emulsifier need be employed in forming the emulsion. In all events, the salts could not be of such a nature and should not be added in such amounts as would detract from the benefits imparted by the use of LiOH base with respect to the demulsibility and viscosity of the emulsion.

The following Example 5 shows two formulations of quick-breaking emulsions containing small amounts of such salts added to improve adhesion property. In this particular case, a combination of salts, namely, of adhesion-improving sodium dichromate and trisodium phosphate (to soften the water) was employed, the combination being so selected as not to lower the demulsibility below the ASTM specifiied minimum of 60%.

*Example 5*

Two representative quick-breaking emulsions (one an ASTM RS–1 type and the other RS–2 type) were prepared from 185–200 penetration Santa Maria California asphalt. Its acid value was equal to 2.0. The formulations and the observed emulsion characteristics (after 24 hours) are shown in Table IV below.

TABLE IV

|  | Type RS-1 | Type RS-2 |
|---|---|---|
| Asphalt, wt. percent | 58.0 | 62.0 |
| Na$_3$PO$_4$, wt. percent | 0.015 | 0.015 |
| LiOH, wt. percent | 0.089 | 0.089 |
| Na$_2$Cr$_2$O$_7$, wt. percent | 0.075 | 0.075 |
| Water, wt. percent | 41.821 | 37.821 |
| Characteristics: | | |
| Residue, percent | 59 | 64 |
| Demulsibility, 35 cc. 0.02 N CaCl$_2$ | 94 | 95 |
| Viscosity at 77° F., SSF | 88 | |
| Viscosity at 122° F., SSF | | 202 |

From Table IV it can be seen that the two emulsions have excellent demulsibilities, and that the residues and viscosities clearly fall within the specifications set forth by ASTM Designation D-977-53 hereinbefore noted.

In conclusion, it will be pointed out that the invention as claimed hereinafter comprises the application of LiOH both as an emulsifying base for single grades of asphalt, such as 185-200 penetration grade Santa Maria California asphalt or 200-300 penetration grade Central California asphalt, as well as blends of different grades of asphalt of different acidities, but with the ultimate acid number of the blend being at least 2.0 or higher, in order to provide quick-breaking emulsions with controlled demulsibilities and viscosities.

I claim:
1. A quick-setting oil-in-water type emulsion consisting essentially of (a) from 40 to 80% by weight of an asphalt characterized by an inherent acidity of at least about 2.0, as the dispersed phase; (b) water, as the continuous phase; and (c) from about 0.015 to about 0.125% by weight of lithium hydroxide as the alkaline base for emulsifying said asphalt in water, said emulsion being characterized by a demulsibility of at least 60%, measured with the aid of 35 ml. of 0.02 N CaCl$_2$ solution according to the ASTM Standard Testing Method D-244-55, and viscosity which, after storage for at least one week, conforms with the ASTM specification D-977-53 for quick-setting asphalt emulsions.

2. An emulsion as defined in claim 1 wherein said asphalt has an inherent acidity of from about 3.0 upwards.

3. An emulsion as defined in claim 1 wherein said asphalt has an inherent acidity from about 3.0 to about 4.0.

4. A quick-setting oil-in-water type emulsion consisting essentially of (a) from 55 to 65% by weight of an asphalt characterized by an inherent acidity of at least 2.0, as the dispersed phase; (b) water as the continuous phase, and (c) from about 0.015 to about 0.125% by weight of lithium hydroxide as the alkaline base for emulsifying said asphalt in water, said emulsion being characterized by a demulsibility of at least 60%, measured with the aid of 35 ml. of 0.02 N CaCl$_2$ solution according to the ASTM Standard Testing Method D-244-55, and a viscosity which, after storage for at least one week, conforms with the ASTM specification D-977-53 for quick-setting emulsions.

5. An emulsion as defined in claim 4 wherein said asphalt has an inherent acidity of from about 3.0 upwards.

6. An emulsion as defined in claim 4, wherein said asphalt has an inherent acidity from about 3.0 to about 4.0.

References Cited by the Examiner

UNITED STATES PATENTS

| 1,643,675 | 9/1927 | Montgomerie | 252—311.5 |
| 2,481,322 | 9/1949 | McCoy | 252—311.5 |
| 2,509,574 | 5/1950 | McCoy | 252—311.5 |

JULIUS GREENWALD, *Primary Examiner.*

JOSEPH R. LIBERMAN, ALBERT T. MEYERS,
*Examiners.*